United States Patent Office 2,825,524
Patented Mar. 4, 1958

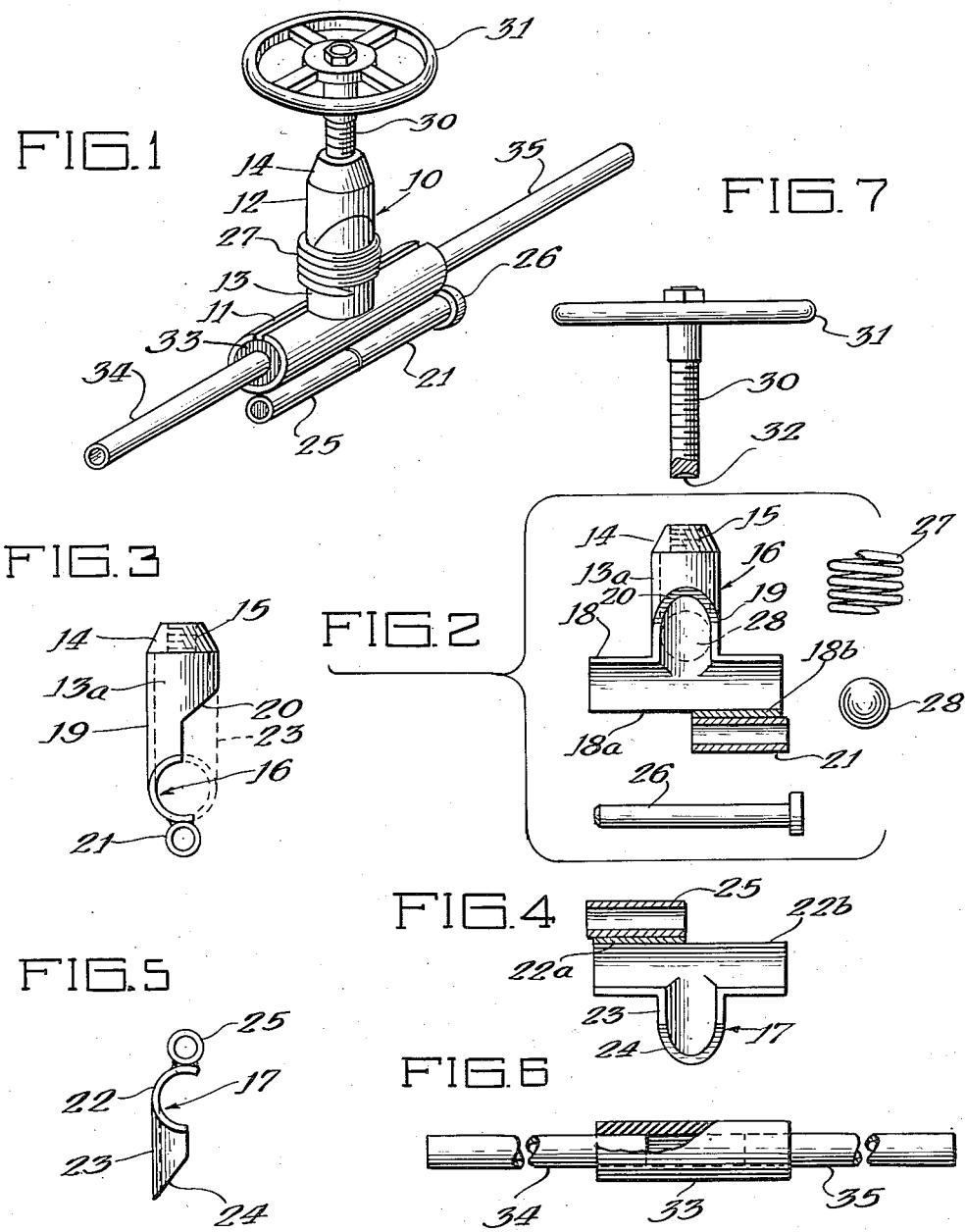

2,825,524

PINCH VALVE

Knox P. Fox, Carlsbad, N. Mex.

Application December 17, 1956, Serial No. 628,618

2 Claims. (Cl. 251—8)

This invention relates to a compressible tube valve structure. More particularly, it relates to valves for the control of the flow of liquors and slurries and particularly to the control of the flow of corrosive liquors and slurries.

Valves which are comprised of metal plugs or gates and machined valve seats give satisfactory operation in systems handling non-corrosive mediums. This type valve is unsatisfactory for handling slurry streams particularly those containing corrosive liquids because of erosion of valve parts with the result that valves leak or stick causing high excess for maintenance or repair.

It is a primary object of this invention to overcome the disadvantages and shortcomings of pinch valve mechanisms heretofore in use.

It is another object of this invention to provide a valve having a compressible rubber sleeve adapted to be squeezed so as to control the effective opening thereof.

It is still another object of this invention to provide a valve having a compressible rubber sleeve which is easily replaceable when worn.

It is a further object of this invention to provide a valve structure enclosing the compressible liner in a simplified construction giving easy access to the rubber sleeve.

These and other objects of the invention will be apparent to those skilled in the art from the following description and the drawings in which, Figure 1 is a perspective view of the complete valve assembly.

Figure 2 is a front elevational view of the basic housing unit of the T-shaped member forming the ball and stem enclosure.

Figure 3 is a side elevational view of the basic housing unit of Figure 2.

Figure 4 is a front elevational view of the secondary portion of the T-member forming the housing.

Figure 5 is a side elevational view of the secondary unit shown in Figure 4.

Figure 6 is a secondary view of the compressible liner and connecting tubing.

Figure 7 is a side elevational view of the actuating means.

Referring to the drawings, the valve comprises a tubular T shaped housing 10 of rigid material, preferably metal. T shaped housing 10 is made up of two sections, tubular head section 11 and the tubular leg section 12 whose axis is transversed to and preferably perpendicular to the central axis of head section 11. Tubular leg section 12 is composed of a portion 13 connecting at one end with head section 11 and at the other with transition portion 13A, which transition portion connects with a terminal portion 14. Terminal portion 14 is internally threaded as at 15.

Housing 10 is adapted to be formed of a basic housing unit 16 and a secondary housing unit 17, each of which is made up of portions of head section 11 and of leg section 12. Unit 16 is adapted to have a segment 18 of the tubular head section 12. Segment 18 extends the full length of said head member. For one-half of the length of the segment, portion 18A is slightly less than one-half the tubular head circumference and for the other one-half, the segment portion 18B is slightly greater than one-half the tubular head circumference. Extending from segment 18 is segment 19 of the leg portion 13 of the tubular leg member 12, which segment 19 has its terminals aligned in a plane running through the central longitudinal axis of head member 11 although these terminals need not, for the purposes of this invention, be in alignment. Unit 16 also includes a segment 20 of transition portion 13A which has a circumference length of one-half the tubular leg initially and increasing until at the end, it is the full circumferential length of said tubular leg section and the whole of terminal section 14. Secured as by tack welding to segment 18B, of substantially equal length therewith, and in alignment with the longitudinal axis of head section 11, is the small diameter tube 21.

Unit 17 is adapted to have a segment 22 which is the balance of the head section 11. Segment 22, over its segment portion 22A, is slightly greater than one-half the tubular head circumference and over its segment portion 22B, is slightly less than one-half the tubular head circumference in length. Extending from segment 22 is segment 23 of the leg portion 13 of the tubular leg section 12 which is the balance of leg portion 13 and terminates with the segment 24 which is the balance of the transition portion 13A. Secured as by tack welding to section 22A, of substantially equal length therewith, and in alignment with the longitudinal axis of head section 11, is a tube 25 of the same diameter as tube 21. Tubes 21 and 25 are adapted to be in central axial alignment with one another. When units 16 and 17 are fitted together, a pin 26 is adapted for sliding fit within the tubes 25 and 21 and secures the bottom of the T-shaped housing 10 and forms a pivot for opening and closing of the housing 10.

To secure the upper parts of units 16 and 17 together, the leg section 12 is provided with a slideable collar 27 or other suitable clamping means, for example, a coil spring. Mounted within leg section 12 is a metal ball 28. Mounted in the threads 15 of terminal section 14 is a feed screw 30. The feed screw 30 has fixed to its upper end, suitable means 31 such as the hand wheel for actuation. At the lower end, feed screw 30 is provided with a concave surface 32 of a curvature adapted to cooperate with the ball mounted within the leg section 12.

Enclosed by head section 11 is a compressible liner 33. This liner is made up of suitable compressible elastic such as rubber, synthetic organic plastic or the like. Liner 33 is adapted to receive tubing 34 and 35 in a press fit of the resilient materials or for securing by suitable means. It will be recognized however, that the valve is adapted for clamping around compressible tubing of suitable diameter wherever there is sufficient length of tubing exposed to accommodate head section 11.

For operation of the valve, the ball 28 is laid inside leg section 12 of the basic housing unit and the secondary unit secured in hinged relationship by pin 26. Unit 16 and 17 are thus secured together by the collar 27. By turning the feed screw 30, the ball is pressed into the liner as a choke. To change liners merely requires retraction of the collar 27 and pivoting of unit 16 and 17 to open position and the new liner inserted in place in the head section 11.

Having thus described my invention, what I claim is:

1. A valve comprising a basic housing member and a secondary member which, in conjunction, form a T- shaped housing unit having a tubular head section and a tubular leg section, said basic housing member consisting of a segment of said head section, a segment of that portion of said leg section adjacent the head section, and a terminal portion of said leg section, internal threading in the terminal portion of said leg section, said secondary member consisting of the balance of said head section, and the balance of that portion of said leg section adjacent the head section, a tube separately secured to each member and adapted to be in axial alignment parallel to the longitudinal axis of said head section, a pin mounted in said tubes to form a hinge, a collar adapted for sliding fit with said leg section whereby the basic housing member and secondary housing member are secured together, a ball mounted within said leg section, and actuating means adapted for movement of the ball along a path in alignment with the central axis of said tubular leg section.

2. A valve comprising a basic housing member and a secondary member which, in conjunction, form a T-shaped housing unit having a tubular head section and a tubular leg section, said basic housing member consisting of a segment of said head section, a segment of that portion of said leg section adjacent the head section, and a terminal portion of said leg section, internal threading in the terminal portion of said leg section, said secondary member consisting of the balance of said head section, and the balance of that portion of said leg section adjacent the head section, a tube separately secured to each member and adapted to be in axial alignment parallel to the longitudinal axis of said head section, a pin mounted in said tubes to form a hinge, a collar adapted for sliding fit with said leg section whereby the basic housing member and secondary housing member are secured together, a ball mounted within said leg section; screw means mounted in said threads of said leg section for actuation of the ball, and a resilient liner mounted in said head section.

References Cited in the file of this patent

UNITED STATES PATENTS

| 582,027 | Smith | May 4, 1897 |

FOREIGN PATENTS

| 191,136 | Great Britain | of 1923 |